United States Patent
Wang (10) Patent No.: US 11,699,276 B2
(45) Date of Patent: Jul. 11, 2023

(54) CHARACTER RECOGNITION METHOD AND APPARATUS, ELECTRONIC DEVICE, AND STORAGE MEDIUM

(71) Applicants: BEIJING XIAOMI MOBILE SOFTWARE CO., LTD., Beijing (CN); Beijing Xiaomi Pinecone Electronics Co., Ltd., Beijing (CN)

(72) Inventor: Dong Wang, Beijing (CN)

(73) Assignees: Beijing Xiaomi Mobile Software., Ltd., Beijing (CN); Beijing Xiaomi Pinecone Electronics Co., Ltd., Beijing (CN)

( * ) Notice: Subject to any disclaimer, the term of this patent is extended or adjusted under 35 U.S.C. 154(b) by 27 days.

(21) Appl. No.: 17/378,536

(22) Filed: Jul. 16, 2021

(65) Prior Publication Data
US 2022/0292293 A1     Sep. 15, 2022

(30) Foreign Application Priority Data

Mar. 11, 2021   (CN) .......................... 202110265269.2

(51) Int. Cl.
*G06V 10/25*     (2022.01)
*G06T 7/13*       (2017.01)
(Continued)

(52) U.S. Cl.
CPC .............. *G06V 10/25* (2022.01); *G06T 7/13* (2017.01); *G06V 10/98* (2022.01); *G06V 30/10* (2022.01)

(58) Field of Classification Search
CPC ........ G06V 10/25; G06V 10/98; G06V 30/10; G06T 7/13
See application file for complete search history.

(56) References Cited

U.S. PATENT DOCUMENTS 6,674,900 B1    1/2004  Ma
10,445,569 B1 *  10/2019  Lin ..................... G06V 30/194
(Continued)

FOREIGN PATENT DOCUMENTS

EP    1146478 A2 *  10/2001    ......... G06K 9/00469
EP    1146478 A2    10/2001

OTHER PUBLICATIONS

Gargi U et al:"Indexing text events in digital video databases", Fourteenth International Conference on Pattern Recognition, vol. 1, Aug. 16, 1998 (Aug. 16, 1998), pp. 916-918, XP010297635, (3 pages).

(Continued)

*Primary Examiner* — Pinalben Patel
(74) *Attorney, Agent, or Firm* — Arch & Lake LLP (57) ABSTRACT

A method, apparatus, electronic device, and storage medium for character recognition are provided. The method may perform image processing on an acquired original image to obtain a region to be recognized. The region may include a character. The method may determine an area ratio of the region to be recognized on the original image. The method may determine an angle between the region to be recognized and a preset direction. The method may determine a character density of the region to be recognized. The method may perform character recognition on the character in the region to be recognized in response to determining that the area ratio is greater than a ratio threshold, the angle is less than an angle threshold, and the character density is less than a density threshold.

20 Claims, 8 Drawing Sheets

(51) Int. Cl.
   *G06V 10/98*   (2022.01)
   *G06V 30/10*   (2022.01)

(56) References Cited

U.S. PATENT DOCUMENTS

| | | | |
|---|---|---|---|
| 2011/0222768 A1 | 9/2011 | Galic | |
| 2011/0222769 A1* | 9/2011 | Galic | G06V 30/1478 382/229 |
| 2012/0155754 A1* | 6/2012 | Chen | G06V 30/18076 382/164 |
| 2015/0278167 A1* | 10/2015 | Arnold | G06F 40/109 382/224 |
| 2018/0295375 A1* | 10/2018 | Ratner | H04N 19/23 |
| 2019/0171875 A1* | 6/2019 | Northrup | G06F 40/163 |
| 2020/0097713 A1* | 3/2020 | Cramer | G06V 30/414 |
| 2021/0124919 A1* | 4/2021 | Balakrishnan | G06V 30/245 |
| 2022/0036062 A1* | 2/2022 | Yuan | G06V 30/413 |

OTHER PUBLICATIONS

Jain Ak et al:"Automatic text location in images and video frames", Pattern Recognition vol. 31 No. 12 Dec. 1, 1998(Dec. 1, 1998), pp. 2055-2076, XP004139539, (22 pages).

Arai Kohei et al:"Method for Extracting Product Information from TV Commercial" International Journal of Advanced Computer Science and Applications (IJACSA), Special Issue on Artificial Intelligence, Jan. 1, 2011 (Jan. 1, 2011), pp. 125-131, XP055876922, (7 pages).

Casey R G et aL:"Strategies in character segmentation: a survey", Proceedings of The Third International Conference on Document Analysis and Recognition, vol. 2, Aug. 14, 1995 (Aug. 14, 1995), pp. 1028-1033, XP010231075, (6 pages).

Blaes Patrick et al:"Mobile IC Package Recognition", 2012, XP055877763, Retrieved from the Internet: URL: https ://stacks.stanford.edu/file/druid:yj296hj2790Young_Blaes_Mobile_IC_Package_Recognition_and_Information_Retrieval.pdf. (6 pages).

Ozgen Azmi Can et al:"Text detection in natural and computer-generated images", 2018 26th Signal Processing and Communications Applications Conference (SIU), IEEE, May 2, 2018 (May 2, 2018), pp. 1-4, XP033373727, (4 pages).

European Search Report in European application No. 21187856.6, dated Jan. 26, 2022, (12 pages).

Xing Hui, Exploration of intelligent image processing [2]: character block recognition, Aug. 2, 2018, https://cloud.tencent.com/developer/article/1174858, (11 pages).

* cited by examiner

CHARACTER RECOGNITION METHOD AND APPARATUS, ELECTRONIC DEVICE, AND STORAGE MEDIUM

CROSS-REFERENCE TO RELATED APPLICATION

This application is based upon and claims priority to Chinese Patent Application No. 202110265269.2, filed on Mar. 11, 2021, the entire content of which is incorporated herein by reference.

TECHNICAL FIELD

The present disclosure generally relates to the technical field of computer image processing, and more particularly, to a character recognition method and apparatus, an electronic device, and a storage medium.

BACKGROUND

In a related art, a character in an image is usually recognized by using an optical character recognition (OCR) technology. However, when character recognition is performed through the OCR technology, all characters in the image may be recognized. There may be many noise characters in some images, particularly images extracted from some specific videos, for example, there may be an unhighlighted ingredient table of a product in an advertisement video or a character in an application interface may be a character that is not required by an advertisement to be highlighted. If character recognition is performed by using the OCR technology, these noise characters may also be recognized, and consequently, obtained character information is not so valid. Therefore, how to improve the effectiveness of character recognition becomes a problem urgent to be solved.

SUMMARY

According to a first aspect of the present disclosure, a method for character recognition is provided. The method may be applied to an electronic device. The electronic device may perform image processing on an acquired original image to obtain a region to be recognized. The region may include a character. The electronic device may determine an area ratio of the region to be recognized on the original image. The electronic device may determine an angle between the region to be recognized and a preset direction. The electronic device may determine a character density of the region to be recognized. The electronic device may perform character recognition on the character in the region to be recognized in response to determining that the area ratio is greater than a ratio threshold, the angle is less than an angle threshold, and the character density is less than a density threshold.

According to a second aspect of the present disclosure, an apparatus is provided. may include one or more processors, a non-transitory computer-readable memory storing instructions executable by the one or more processors. The one or more processors may be configured to perform image processing on an acquired original image to obtain a region to be recognized. The region may include a character. The one or more processors may also be configured to determine an area ratio of the region to be recognized on the original image. The one or more processors may also be configured to determine an angle between the region to be recognized and a preset direction. The one or more processors may also be configured to determine a character density of the region to be recognized. The one or more processors may also be configured to perform character recognition on the character in the region to be recognized in response to the area ratio being greater than a ratio threshold, the angle being less than an angle threshold, and the character density being less than a density threshold.

According to a third aspect of the present disclosure, a non-transitory computer-readable storage medium having stored therein instructions is provided. When the instructions are executed by one or more processors of a computing device, the instructions may cause the computing device to perform image processing on an acquired original image to obtain a region to be recognized. The region may include a character. The instructions may also cause the computing device to determine an area ratio of the region to be recognized on the original image. The instructions may also cause the computing device to determine an angle between the region to be recognized and a preset direction. The instructions may also cause the computing device to determine a character density of the region to be recognized. The instructions may also cause the computing device to perform character recognition on the character in the region to be recognized in response to the area ratio being greater than a ratio threshold, the angle being less than an angle threshold, and the character density being less than a density threshold.

It is to be understood that the above general descriptions and detailed descriptions below are only examples and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the present disclosure.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of apparatuses and methods consistent with aspects related to the present disclosure as recited in the appended claims.

Optical character recognition (OCR) refers to a process that an electronic device checks a sign on paper or an image, determines a shape thereof in a mode of detecting brightness, and then translates the shape into a computer character by a character recognition method. That is, a technology of, for a printed character, optically converting a character in an image into an image file of a black and white dot matrix, and converting the character in the image into a text format through recognition software for word processing software to further edit and process.

An existing OCR technology may recognize all characters in an image. However, in some scenarios, for example, in some images for advertising, details and the like of a displayed product exist, and when these details are not contents required by an advertisement to be propagated, recognizing these characters may apparently cause more contents to be recognized, thereby affecting the recognition efficiency. For another example, there may be printed objects, backgrounds with characters and the like in some movie and television play type videos such as television plays or movies, particularly some lifestyle movies and television plays, but these characters do not need to be recognized, and similarly, recognizing these characters may apparently cause more contents to be recognized, thereby affecting the recognition efficiency. In addition, since more invalid characters are recognized, the effectiveness of text recognition is not ideal. Of course, in some other scenarios, there are invalid characters in backgrounds of shooting subjects, and recognizing these characters may also affect the effectiveness of character recognition.

Figure 1:
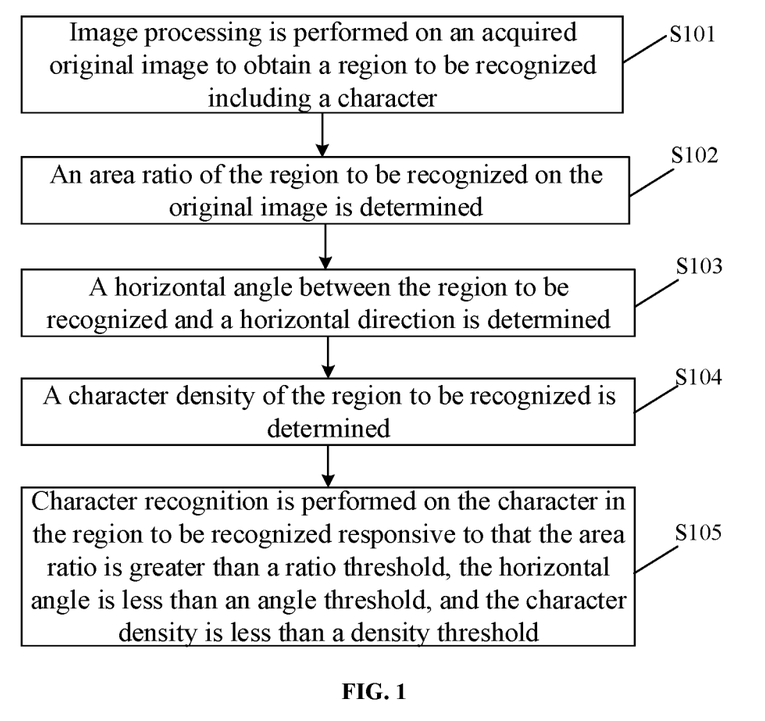
FIG. 1 is a flow chart showing a character recognition method, according to an example of the present disclosure.

Based on this, FIG. 1 is a flow chart showing a character recognition method, according to an example. As illustrated in FIG. 1, the method includes the following operations.

At S101, image processing is performed on an acquired original image to obtain a region to be recognized including a character.

It is to be noted that the method of the example of the disclosure may be applied to an electronic device. Here, the electronic device includes a mobile device or a fixed device. The mobile device may include a mobile phone, a tablet computer, a wearable device, and the like. The fixed device may include a desktop computer, an all-in-one computer, a smart home device, and the like. In a word, the electronic device is any electronic device with a processor and capable of processing an input image or a stored image to recognize a character.

Here, the original image may include a color image, for example, a red green blue (RGB) image. Of course, in some other examples, the original image may also include a gray image.

Here, the acquired original image may include an original image acquired from the electronic device, or may include an original image acquired from another electronic device.

Furthermore, the original image acquired from the electronic device may further include an original image acquired from an existing stored image of the electronic device or an original image extracted from a played video.

It can be understood that, if the region to be recognized including the character needs to be obtained, the image should be processed, namely at least a character region and non-character region in the image are distinguished. To distinguish the character region and non-character region in the image, each object in the image needs to be recognized, and thus feature extraction and the like need to be performed on the image. In some examples, when the original image is a color image, since the color image includes a relatively large amount of information, a large amount of information needs to be analyzed in a feature extraction process, which may inevitably affect the image processing efficiency and further affect the character recognition efficiency. Based on this, in some examples, the operation that image processing is performed on the acquired original image may include: gray processing is performed on the acquired original image to obtain a gray image.

In some other examples, the operation that image processing is performed on the acquired original image to obtain the region to be recognized including the character includes: image processing is performed on the acquired original image to obtain a contour of each object in the original image; and the region to be recognized including the character is determined according to the contour of each object in the original image.

It can be understood that a feature of the region to be recognized including the character (i.e., the character region) is that edges are very neat and may be connected into a long rectangle. As such, the contour of each object may be determined at first to determine the region to be recognized including the character rapidly.

Based on this, the operation that image processing is performed on the acquired original image to obtain the contour of each object in the original image may include: edge detection is performed on the acquired original image to determine the contour of each object.

The operation that edge detection is performed on the acquired original image includes: edge detection is performed on the gray image.

Here, the operation that edge detection is performed on the gray image may include: edge detection is performed on the gray image by using a Sobel operator. Of course, in another example, edge detection may also be performed by using a Canny operator, the Canny operator performing edge detection using double thresholds and performing non-maximum suppression.

To improve the accuracy of an obtained edge, in some examples, after the contour of each object is determined, the method further includes: binarization processing is performed on the contour.

Here, the binarization processing refers to setting a gray value of a pixel(s) in the image to 0 or 255. That is, gray value adjustment is further performed on the obtained contour. Therefore, noise points in an edge detection process may be reduced, and the edge detection accuracy may be improved.

In some other examples, to further distinguish the character region from the non-character region accurately, the method further includes: expansion and/or erosion processing is performed on the contour subjected to the binarization processing.

For example, de-noising processing is performed on the contour subjected to expansion and/or erosion processing. Here, the de-noising processing includes removing a ragged contour.

For example, the edges of the region to be detected including the character (i.e., the character region) are very neat and may be connected into a long rectangle. Based on this, in some examples, the operation that the region to be recognized including the character is determined according to the contour of each object in the original image may include: according to the contour of each object in the original image, if the contour is a long rectangle or an approximately long rectangle, a region including an object corresponding to the contour of the long rectangle or the approximately long rectangle is determined as the region to be recognized including the character.

As such, image processing may be performed on the acquired original image to obtain all regions including characters in the original image.

At S102, an area ratio of the region to be recognized on the original image is determined.

At S103, an angle between the region to be recognized and a preset direction is determined.

At S104, a character density of the region to be recognized is determined.

It is to be noted that a sequence of operations S102, S103, and S104 is not limited. In some examples, operation S102 may be executed at first, then operation S103 is executed, and then operation S104 is executed. In some other examples, operation S103 may be executed at first, then operation S104 is executed, and then operation S102 is executed. In some other examples, operation S104 may be executed at first, then operation S103 is executed, and then operation S102 is executed.

Here, the preset direction refers to a direction of a character to be recognized. For example, the preset direction may be a direction of a bottom edge of the image in the electronic device. Under a normal condition, the electronic device is placed perpendicular to the ground, and the image in the electronic device is also perpendicular to the ground for a user to view conveniently. Based on this, the preset direction may include a horizontal direction.

It can be understood that the recognized region to be recognized including the character includes all character regions. As mentioned above, in some scenarios, some characters do not need to be recognized, for example, product details and other noise characters in an advertisement video.

It can be understood that a feature of a character region including a noise character usually differs to some extent from a feature of a character region including a valid character. Under a normal condition, the noise character occupies a relatively small area, or is presented in an inclined state and other states in the image, or the noise character is relatively high in density, and the like. Based on this, at S105, character recognition is performed on the character in the region to be recognized responsive to that the area ratio is greater than a ratio threshold, the angle is less than an angle threshold, and the character density is less than a density threshold.

Here, the ratio threshold may be set by using personal experience. It can be understood that, for different recognition requirements, font sizes and the like of characters to be recognized differ to some extent. For example, for an image extracted from a movie and television type video, a subtitle in the movie and television type video is mainly to be recognized. Based on this, the ratio threshold may be set according to a frequently used subtitle size. For an advertisement image, different advertisements are intended to propagate different contents, and some advertisements may need to present contents to be propagated in an exaggerated way. Apparently, if a threshold is automatically set for an image of this type, or a fixed threshold is set, a character region practically to be recognized may be excluded. Therefore, setting by using personal experience may reduce a mistaken recognition phenomenon that a valid character is determined as an invalid character under such a special character recognition requirement, and setting by using personal experience may be adapted to the present recognition requirement, and is favorable for the effectiveness of character recognition.

It is to be added that, in the example, an area of the original image may be an area of a screen of the electronic device. It can be understood that the area of the screen of the electronic device is positively correlated with the ratio threshold. Based on this, in some examples, the ratio threshold may be set according to the area of the screen of the electronic device.

In some other examples, the ratio threshold may be set automatically, and for example, may be determined directly according to a historical setting of the user. In some examples, the ratio threshold may be determined automatically according to the type of an image to be recognized. It can be understood that different ratio thresholds may be set for different types of images. For example, for an image of an office or learning file, the ratio threshold may be set taking an area occupied by font size 4 as a reference. For an image of a poster file and the like, the ratio threshold may be set taking an area occupied by a larger font size as a reference. In some other examples, the ratio threshold may also be determined automatically according to the recognition requirement. For example, if the recognition requirement indicates that the subtitle in the image is to be recognized, a presently set subtitle font size and a position of the subtitle may be detected to determine the ratio threshold. Since the ratio threshold may be set automatically independent of personal experiences, such that manual operations are simplified, and the intelligence of the electronic device is higher.

Here, the angle threshold may be an angle approximately parallel to the preset direction, such that regions to be recognized that are inclined greatly relative to the preset direction may be excluded.

Here, the character density may be set by using personal experience, or may be set automatically. Specifically, the character density may be determined directly according to a historical setting of the user, or may be determined automatically according to the type of the image to be recognized. It can be understood that different character densities may be set for different types of images. For example, it is apparent that a character density of the image of the office or learning file is higher than a character density of the image of the poster file.

According to the example of the disclosure, the area ratio of the region to be recognized on the original image is taken as a consideration factor for judging whether the region to be recognized is a valid character region, the character density and the angle between the region to be recognized and the preset direction are also taken as consideration factors, such that the accuracy of judging whether the region to be recognized is a valid character region is improved, and furthermore, a foundation is provided for improving the effectiveness of character recognition. In the example of the disclosure, the character recognition is performed on a region to be recognized of which an area ratio is greater than the ratio threshold, an angle is less than the angle threshold, and a character density is less than the density threshold. A region to be recognized of which an area ratio is less than or equal to the ratio threshold, or an angle is more than or equal to the angle threshold, or a character density is more than or equal to the density threshold is determined as a noise character region, and character recognition is not performed on the region to be recognized. Therefore, recognition of the noise character region may be reduced, namely recognition of an invalid character region is reduced, and the effectiveness of character recognition is improved. Since the invalid character region is not recognized, the character recognition efficiency may further be improved.

Figure 2:
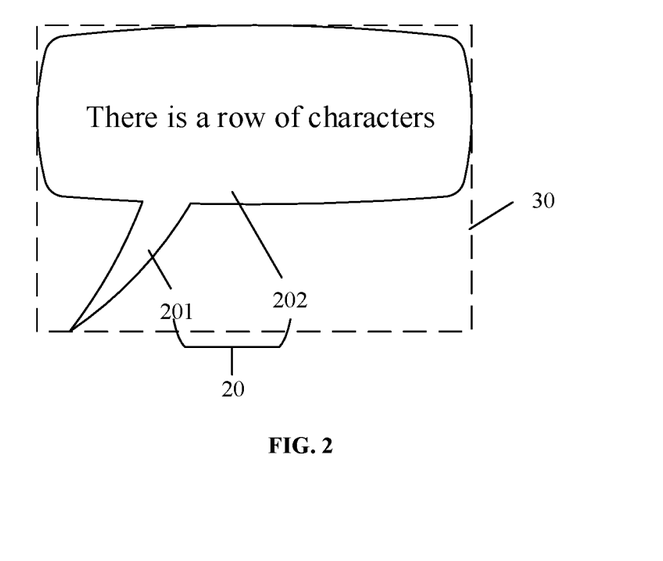
FIG. 2 is a schematic diagram illustrating a scenario of determining an area of a region to be recognized in character recognition, according to the related art.

In the related art, in order to obtain the area of the region to be recognized rapidly, a minimum bounding rectangle of the region to be recognized may usually be found, and an area of the minimum bounding rectangle is determined as the area of the region to be recognized. Specifically, referring to FIG. 2, as illustrated in FIG. 2, in some cases, some noise points exist when a contour of an object is drawn, these noise points protrude from a character region to form a protruding region 201, and the protruding region 201 and the character region 202 are recognized as a region to be recognized 20. In such case, if an area of a minimum bounding rectangle 30 is determined as an area of the region to be recognized 20, there may apparently be a relatively great error. In some optional examples, at S102, the operation that the area ratio of the region to be recognized on the original image is determined includes: a maximum inscribed rectangle of the region to be recognized is determined; an area of the region to be recognized is determined according to an area of the maximum inscribed rectangle; and the area ratio of the region to be recognized on the original image is determined according to the area of the region to be recognized.

Figure 3:
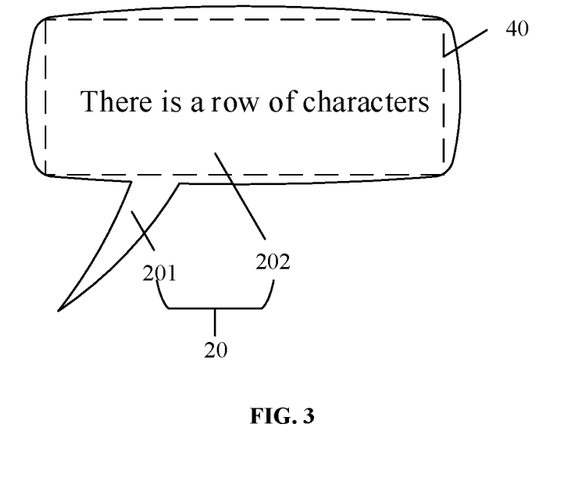
FIG. 3 is a schematic diagram illustrating a scenario of determining an area of a region to be recognized, according to an example of the present disclosure.

Specifically, referring to FIG. 3, as illustrated in FIG. 3, the region to be recognized 20 may include the character region 202 and the protruding region 201, and a maximum inscribed rectangle 40 of the region to be recognized 20 is found. Here, it is apparent that the maximum inscribed rectangle 40 is close to an area of the character region 202 in the region to be recognized 20. Therefore, in the example, the maximum inscribed rectangle of the region to be recognized is determined, and the area of the region to be recognized is determined based on the area of the maximum inscribed rectangle, such that the area of the region to be recognized may be obtained more accurately, the area ratio of area of the region to be recognized to the area of the original image may be obtained more accurately, and a foundation is provided for determining whether the region to be recognized is a valid character region accurately.

In some examples, in order to determine the area of the region to be recognized more accurately, the operation that the area of the region to be recognized is determined according to the area of the maximum inscribed rectangle may include: the area of the region to be recognized is determined according to the area of the maximum inscribed rectangle and an area error.

Here, the area error may be obtained by using big data statistics, or, may be obtained in another recognition manner. In a word, the area error is used to compensate the area of the maximum inscribed rectangle to be closer to the area of the region to be recognized, such that the area of the region to be recognized may be determined more accurately.

In some examples, the operation that the character recognition is performed on the character in the region to be recognized includes: binarization processing is performed on the region to be recognized.

It is to be added that, before OCR is performed on the region to be recognized, binarization processing may be performed on the region to be recognized at first.

Here, the binarization processing refers to setting the gray value of the pixel in the image to 0 or 255. In practical applications, the binarization processing refers to setting a gray value of a pixel of which the gray value is more than or equal to a binarization threshold to 255 while setting a gray value of a pixel less than the binarization threshold to 0, thereby distinguishing a specific object from a background. Here, the binarization processing is for a purpose of highlighting pixels occupied by the character to perform OCR. The operation that binarization processing is performed on the region to be recognized may include: binarization processing is performed on a gray image of the region to be recognized.

Therefore, in the example of the disclosure, the binarization processing may be performed on the region to be recognized at first to distinguish the region to be recognized from a region except the region to be recognized better for subsequent character recognition.

Here, the binarization threshold is fixed, may be set according to an empirical value, or may be a frequently used binarization threshold acquired through a cloud.

In some optional examples, the binarization threshold may be determined adaptively according to a gray value of the region to be recognized. Through the adaptively determined binarization threshold, a character part may be distinguished from a background part better, such that the character recognition efficiency is improved, and meanwhile, the character recognition accuracy is improved.

Figure 4:
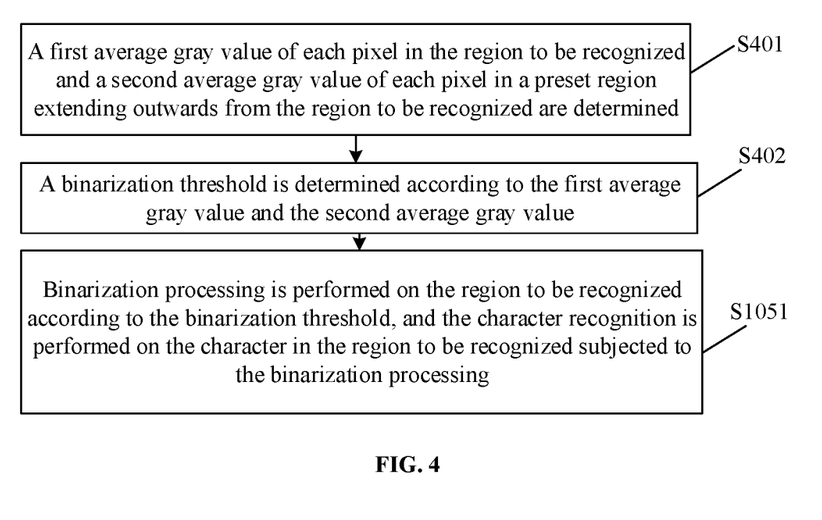
FIG. 4 is another flow chart showing a character recognition method, according to an example of the present disclosure.

For example, referring to FIG. 4, FIG. 4 is another flow chart showing a character recognition method, according to an example. The method may further include the following operations.

At S401, a first average gray value of each pixel in the region to be recognized and a second average gray value of each pixel in a preset region extending outwards from the region to be recognized are determined.

At S402, a binarization threshold is determined according to the first average gray value and the second average gray value.

At S105, the operation that the character recognition is performed on the character in the region to be recognized includes as follows.

At S1051, binarization processing is performed on the region to be recognized according to the binarization threshold, and the character recognition is performed on the character in the region to be recognized subjected to the binarization processing.

In the example of the disclosure, the first average gray value of each pixel of the region to be recognized and the second average gray value of each pixel in the preset region extending outwards from the region to be recognized are determined as consideration parameters for determining the binarization threshold, such that the binarization threshold, when used as the binarization threshold for binarization processing over the present region to be recognized, may be adapted to the present region to be recognized better, and higher binarization processing accuracy is achieved.

Here, the preset region may be a closed region that extends outwards by a predetermined distance, or may be a semi-closed region that extends outwards along a predetermined direction.

In some examples, the operation that the character recognition is performed on the character in the region to be recognized subjected to the binarization processing may further include: expansion de-noising processing is performed on the region to be recognized subjected to the binarization processing; and the character recognition is performed on the character in the region to be recognized subjected to the binarization processing and the expansion de-noising processing.

In the example, the expansion de-noising processing may further be performed on the region to be recognized subjected to the binarization processing, such that a character omission phenomenon caused by coverage of a character by a raw edge generated by binarization processing may be reduced, the completeness of the character in the region to be recognized is ensured, and the character recognition accuracy is ensured.

In some optional examples, the method further includes: a height and width of the region to be recognized are determined.

At S105, the operation that the character recognition is performed on the character in the region to be recognized, responsive to that the area ratio is greater than the ratio threshold, the angle is less than the angle threshold, and the character density is less than the density threshold, may further include: responsive to that the height is greater than a height threshold and/or the width is greater than a width threshold, the area ratio is greater than the ratio threshold, the angle is less than the angle threshold, and the character density is less than the density threshold, character recognition is performed on the character in the region to be recognized.

Here, the height threshold and/or the width threshold may be set by experience, or may be determined according to the type of the image.

In the example, the height and width of the region to be recognized are also taken as consideration factors, such that the accuracy of determining that the region to be recognized is a valid character region may further be improved.

In some optional examples, at S104, the operation that the character density of the region to be recognized is determined may include: a character count of the region to be recognized is determined; and the character density of the region to be recognized is determined according to the character count.

Here, the operation that the character count of the region to be recognized is determined may be implemented by traversing pixels of the region to be recognized to determine the character count of the region to be recognized. For example, the operation that the pixels of the region to be recognized are traversed to determine the character count of the region to be recognized may include: the pixels of the region to be recognized are traversed; when a pixel is blank, the pixel is determined as a character space; and the character count of the region to be recognized is determined according to the number of character spaces. It can be understood that the character count is positively correlated with the character density.

It is to be added that, in some scenarios, still taking an image of an advertisement video as an example, in the image of the advertisement video, a product and its details are in the same horizontal direction when the product is displayed. In such case, although a character region of the product details is an invalid character region, both an area ratio and an angle satisfy the conditions, then the character region may still be determined as a valid character region, and a system needs to perform the character recognition on the region to be recognized, which may apparently increase a recognition burden and is unfavorable for the effectiveness and efficiency of character recognition.

Based on this, the character density is also taken as a consideration factor for judging whether the region to be recognized is a valid character region, such that the phenomenon that an invalid region to be recognized of which an area ratio is greater than the ratio threshold, an angle is less than the angle threshold, but a character density is too high is still determined as a valid character region may be reduced, and whether the region to be recognized is a valid character region may be determined accurately.

According to the example of the disclosure, the character count is determined to determine the character density, such that simplicity and convenience for operation are ensured, and an algorithm is simple and easy to operate.

It is to be added that, when the pixels of the region to be recognized are traversed to determine the character count of the region to be recognized, a pixel that is blank is determined as a character space, and in view of the particularity of Chinese characters, some Chinese characters may be blank in a scanning process, for example, "为", or left and right radicals may be determined as two or three spaces, such that the recognized character count is not accurate. Based on this, in some optional examples, the operation that the character count of the region to be recognized is determined may include: the region to be recognized is projected to a set direction to obtain a projected region; a pixel density distribution of the projected region is determined; and the character count of the region to be recognized is determined according to the pixel density distribution.

Figure 5:
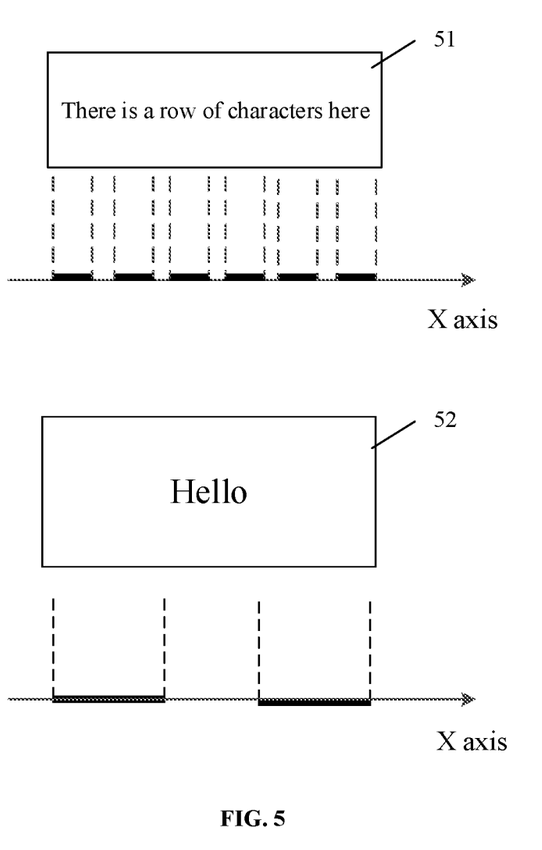
FIG. 5 is a schematic diagram illustrating a scenario of determining a character density, according to an example of the present disclosure.

Here, the set direction may be a row direction of the character in the region to be recognized. In some examples, the set direction may be the horizontal direction. For example, referring to FIG. 5, FIG. 5 is a schematic diagram illustrating a scenario of determining a character density, according to an example. As illustrated in FIG. 5, the set direction is a direction of the X axis. Here, the direction of the X axis is a direction of a row including a row of characters.

Taking two regions to be recognized such as a first region to be recognized 51 and a second region to be recognized 52 as an example, a character density of the first region to be recognized 51 is higher than a character density of the second region to be recognized 52. Here, projecting the region to be recognized to the set direction to obtain the projected region may be understood as longitudinally pressing the region to be recognized to the X axis, namely there may be a shaded part after a pixel with a character is projected to the X axis, and there is no shaded part after a pixel without any character is projected to the X axis. Specifically, there are six shaded parts after the first region to be recognized 51 is projected to the X axis, and it indicates that the first region to be recognized 51 includes six characters. There are two shaded parts after the second region to be recognized 52 is projected to the X axis, and it indicates that the second region to be recognized 52 includes two characters. Here, the pixel density distribution of the projected region is a distribution of the shaded parts. It is apparent that, if the pixel density distribution is greater, the character count is larger.

According to the example of the disclosure, the region to be recognized is projected to the set direction to determine the character count of the region to be recognized, such that the character count of the region to be recognized may be determined more accurately, and the phenomenon that some special characters are traversed as multiple characters may be reduced.

The following takes the condition that the original image is extracted from a played video as an example.

In some optional examples, the method may further include: a frame image corresponding to a present frame extraction period is extracted from a video to be processed as the original image according to the frame extraction period.

Here, the video to be processed may be any video including a noise character, such as an advertisement video, or a movie and television play type video. For example, in many scenarios, lifestyle movie and television play type videos include objects or backgrounds including characters, and these characters are noise characters. Therefore, it is necessary to remove a noise character region from such a video, and then character recognition is performed. In this manner, the efficiency and effectiveness of character recognition may be improved.

For example, the frame extraction period is at least less than a minimum interval that a picture changes. For example, if the picture changes every five seconds, the frame extraction period at least less than five seconds. As such, it may be ensured that each picture is acquired, and valid characters in the whole video to be processed may be recognized.

In some other optional examples, the method may further include: the frame extraction period is determined according to a total length of the video to be processed.

For example, the total length of the video to be processed is positively correlated to the frame extraction period. That is, if the total length of the video to be processed is greater, the frame extraction period may be set to be longer, and conversely, if the total length of the video to be processed is smaller, the frame extraction period may be set to be shorter.

In the example of the disclosure, the frame extraction period is adjusted automatically according to the total length of the video to be processed, such that the phenomenon of low character recognition efficiency caused by processing and recognition of more frame images of a long video may be reduced, and the character recognition efficiency of the video may be improved.

In some optional examples, the operation at S105 that character recognition is performed on the character in the region to be recognized may further include: OCR is performed on the character in the region to be recognized to obtain first character information; and error correction processing is performed on the first character information to obtain second character information.

Here, the operation that error correction processing is performed on the first character information may include: the first character information is input to a pre-trained language model, and error correction processing is performed on the first character information by using the language model.

Here, the language model may be any pre-trained language model for error correction processing. Here, in order to improve the character recognition accuracy, the language model may be a language model of which a utilization rate is highest or an error rate is lowest on the market.

According to the example of the disclosure, compared with obtaining a character recognition result only by performing OCR on the character in the region to be recognized, the example of the disclosure has the advantage that error correction processing may further be performed on the recognized first character information, such that the character recognition accuracy is improved.

Furthermore, the present disclosure provides a specific example to further understand the character recognition method provided in the examples of the present disclosure.

The example may be applied to the following scenarios: subtitles are extracted from a television play, a movie and the like in a video website; and an advertiser extracts valid characters from an advertisement video for subsequent advertisement classification, accurate advertising, and the like.

Figure 6:
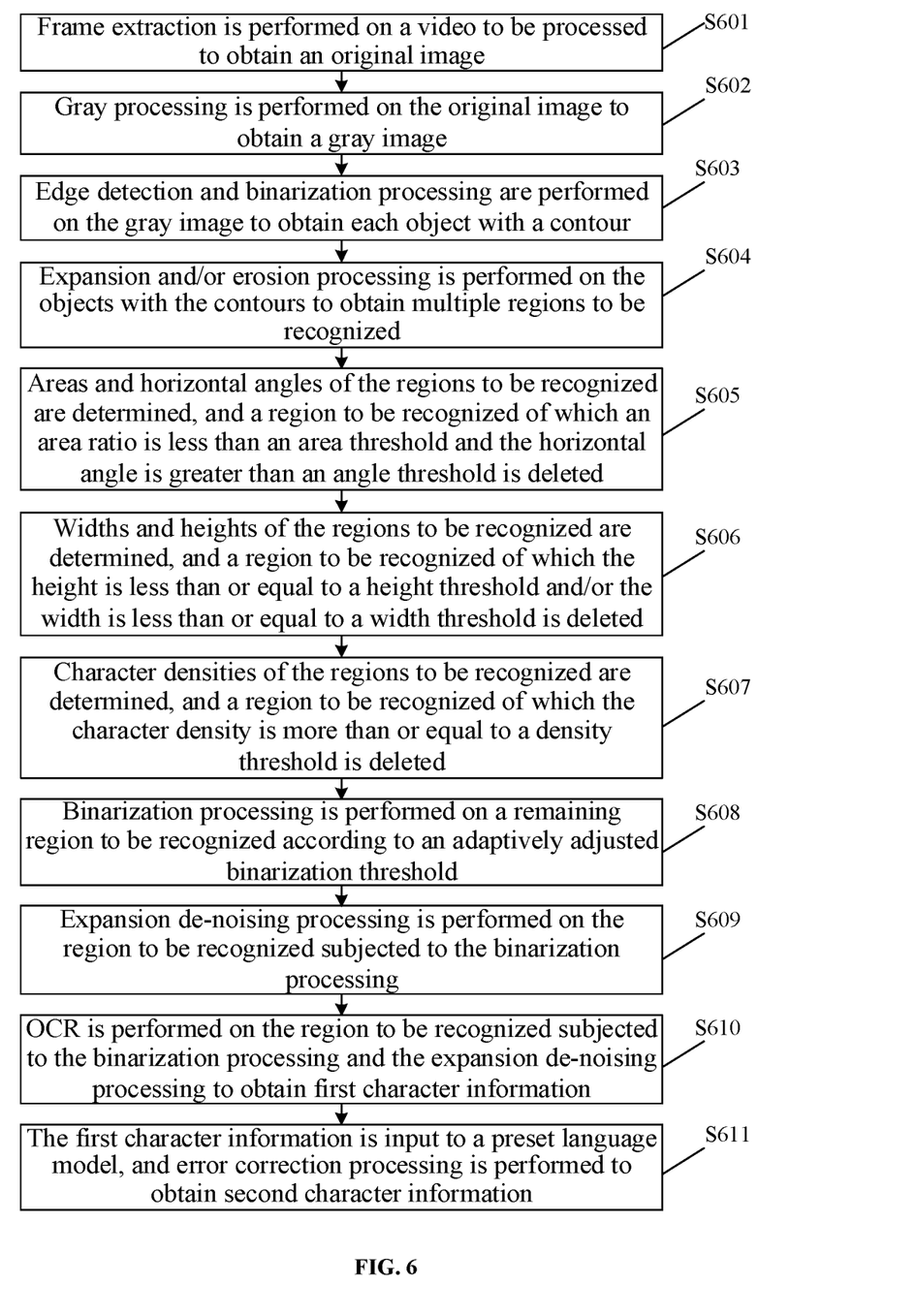
FIG. 6 is a flow chart showing a character recognition method, according to an example of the present disclosure.

Referring to FIG. 6, FIG. 6 is a flow chart showing character recognition, according to an example. As illustrated in FIG. 6, the method may include the following operations.

At S601, frame extraction is performed on a video to be processed to obtain an original image.

Here, the video to be processed may be an advertisement video, or may be a video such as a movie and a television play. Here, the original image may be an RGB image.

It is to be added that, in order to cover all character information of the video to be processed, the operation that frame extraction is performed on the video to be processed may include: frame extraction is performed on the video to be processed according to a frame extraction period to obtain original images of all frames, and the following image processing and character recognition are performed on the original image of each frame.

At S602, gray processing is performed on the original image to obtain a gray image.

At S603, edge detection and binarization processing are performed on the gray image to obtain each object with a contour.

At S604, expansion and/or erosion processing is performed on the objects with the contours to obtain multiple regions to be recognized.

At S605, areas and horizontal angles of the regions to be recognized are determined, and a region to be recognized of which an area ratio is less than an area threshold and the horizontal angle is greater than an angle threshold is deleted.

Here, an area of a maximum inscribed rectangle of the region to be recognized may be determined as the area of the region to be recognized.

Here, the area threshold may be determined according to a type of the video. For example, in case of extracting subtitles in a television play, a movie and the like, an area ratio of a presently set subtitle font size may be determined as the area threshold.

At S606, widths and heights of the regions to be recognized are determined, and a region to be recognized of which the height is less than or equal to a height threshold and/or the width is less than or equal to a width threshold is deleted.

Here, the height threshold and the width threshold may also be determined according to the type of the video. Still taking the television play and movie type video as an example, a height and width corresponding to the presently set subtitle font size may be determined as the height threshold and the width threshold respectively.

At S607, character densities of the regions to be recognized are determined, and a region to be recognized of which the character density is more than or equal to a density threshold is deleted.

Here, the operation that the character density of the region to be recognized is determined may include: the region to be recognized is projected to a horizontal direction to obtain a projected region; a pixel density distribution of the projected region is determined; a character count of the region to be recognized is determined according to the pixel density distribution; and the character density of the region to be recognized is determined according to the character count.

Here, the density threshold may also be determined according to the type of the video. Still taking the television play and movie type video as an example, a presently set subtitle density may be determined as the density threshold.

At S608, binarization processing is performed on a remaining region to be recognized according to an adaptively adjusted binarization threshold.

Here, the adaptively adjusted binarization threshold is determined by counting a first average gray value of each pixel in the region to be recognized and a second average gray value of each pixel in a preset region extending outwards from the region to be recognized.

At S609, expansion de-noising processing is performed on the region to be recognized subjected to the binarization processing.

At S610, OCR is performed on the region to be recognized subjected to the binarization processing and the expansion de-noising processing to obtain first character information.

At S611, the first character information is input to a preset language model, and error correction processing is performed to obtain second character information.

Here, the language model may be any pre-trained language model for error correction processing. Here, in order to improve the character recognition accuracy, the language model may be a language model of which a utilization rate is highest or an error rate is lowest on the market.

According to the example, at first, the areas of the maximum inscribed rectangles of the regions to be recognized are calculated as the areas of the regions to be recognized, such that calculation results of the area are more accurate. Then, the horizontal angles of the regions to be recognized may be determined to remove an invalid character region of which the horizontal angle is more than or equal to the angle threshold and which is apparently inclined relative to a horizontal plane. Next, the character densities may be counted to remove an invalid character region of which the density is apparently too high. When the character density is counted, the region to be recognized is projected to the horizontal direction, and then the character density is determined according to the pixel density distribution of the projected region, such that the character density calculation accuracy is improved. Moreover, when another region which does not need to be recognized is shielded, binarization processing is performed through the adaptively calculated binarization threshold, such that higher adaptability to each region to be recognized may be ensured, and the binarization accuracy may be improved. Finally, error correction may further be performed on a recognition result of OCR by using the pre-trained language model, such that the recognition result of OCR may be improved, and the character recognition accuracy may further be improved.

Figure 7:
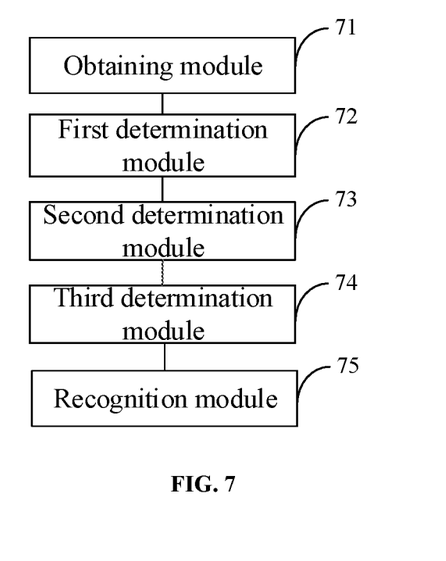
FIG. 7 is a block diagram of a character recognition apparatus, according to an example of the present disclosure.

FIG. 7 is a block diagram of a character recognition apparatus, according to an example. Referring to FIG. 7, the apparatus includes an obtaining module 71, a first determination module 72, a second determination module 73, a third determination module 74, and a recognition module 75.

The obtaining module 71 is configured to perform image processing on an acquired original image to obtain a region to be recognized including a character.

The first determination module 72 is configured to determine an area ratio of the region to be recognized on the original image.

The second determination module 73 is configured to determine an angle between the region to be recognized and a preset direction.

The third determination module 74 is configured to determine a character density of the region to be recognized.

The recognition module 75 is configured to perform character recognition on the character in the region to be recognized responsive to that the area ratio is greater than a ratio threshold, the angle is less than an angle threshold, and the character density is less than a density threshold.

In an example, the apparatus further includes: a fourth determination module and a fifth determination module.

The fourth determination module is configured to determine a first average gray value of each pixel in the region to be recognized and a second average gray value of each pixel in a preset region extending outwards from the region to be recognized.

The fifth determination module is configured to determine a binarization threshold according to the first average gray value and the second average gray value.

The recognition module 75 is further configured to: perform binarization processing on the region to be recognized according to the binarization threshold, and perform the character recognition on the character in the region to be recognized subjected to the binarization processing.

In an example, the first determination module 72 is further configured to: determine a maximum inscribed rectangle of the region to be recognized; determine an area of the region to be recognized according to an area of the maximum inscribed rectangle; and determine the area ratio of the region to be recognized on the original image according to the area of the region to be recognized.

In an example, the apparatus further includes: a sixth determination module, configured to determine a height and width of the region to be recognized.

The recognition module 75 is further configured to perform the character recognition on the character in the region to be recognized responsive to that the height is greater than a height threshold and/or the width is greater than a width threshold, the area ratio is greater than the ratio threshold, the angle is less than the angle threshold, and the character density is less than the density threshold.

In an example, the third determination module 74 is further configured to: determine a character count of the region to be recognized; and determine the character density of the region to be recognized according to the character count.

In an example, the third determination module 74 is further configured to: project the region to be recognized to a set direction to obtain a projected region, the set direction being a row direction of the character in the region to be recognized; determine a pixel density distribution of the projected region; and determine the character count of the region to be recognized according to the pixel density distribution.

In an example, the apparatus further includes: a determination module, configured to extract a frame image corresponding to a present frame extraction period from a video to be processed as the original image according to the frame extraction period.

In an example, the apparatus further includes: a seventh determination module, configured to determine the frame extraction period according to a total length of the video to be processed.

In an example, the recognition module 75 is further configured to: perform OCR on the character in the region to be recognized to obtain first character information; and perform error correction processing on the first character information to obtain second character information.

With respect to the apparatus in the above examples, the specific manners for performing operations for individual modules therein have been described in detail in the examples regarding the methods, which will not be repeated herein.

Figure 8:
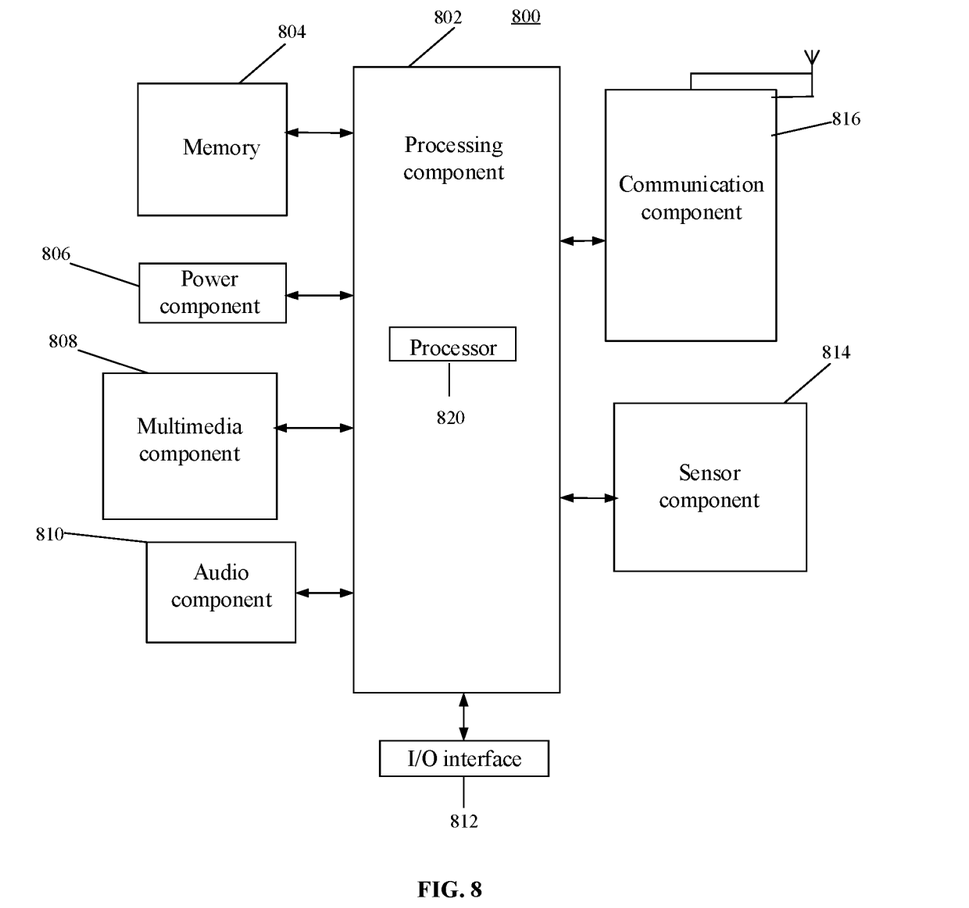
FIG. 8 is a block diagram of an electronic device, according to an example of the present disclosure.

FIG. 8 is a block diagram of an electronic device 800, according to an example. For example, the electronic device 800 may be a mobile phone, a computer, a digital broadcast terminal, a messaging device, a gaming console, a tablet, a medical device, exercise equipment, a personal digital assistant, and the like.

Referring to FIG. 8, the electronic device 800 may include one or more of the following components: a processing component 802, a memory 804, a power component 806, a multimedia component 808, an audio component 810, an input/output (I/O) interface 812, a sensor component 814, or a communication component 816.

The processing component 802 typically controls overall operations of the electronic device 800, such as the operations associated with display, telephone calls, data communications, camera operations, and recording operations. The processing component 802 may include one or more processors 820 to execute instructions to perform all or part of the operations in the abovementioned method. Moreover, the processing component 802 may include one or more modules which facilitate interaction between the processing component 802 and other components. For instance, the processing component 802 may include a multimedia module to facilitate interaction between the multimedia component 808 and the processing component 802.

The memory 804 is configured to store various types of data to support the operation of the electronic device 800. Examples of such data include instructions for any applications or methods operated on the electronic device 800, contact data, phonebook data, messages, pictures, video, etc. The memory 804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 806 provides power for various components of the electronic device 800. The power component 806 may include a power management system, one or more power supplies, and other components associated with generation, management and distribution of power for the electronic device 800.

The multimedia component 808 includes a screen providing an output interface between the electronic device 800 and a user. In some examples, the screen may include a liquid crystal display (LCD) and a touch panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some examples, the multimedia component 808 includes a front camera and/or a rear camera. The front camera and/or the rear camera may receive external multimedia data when the electronic device 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a microphone (MIC), and the MIC is configured to receive an external audio signal when the electronic device 800 is in an operation mode, such as a call mode, a recording mode and a voice recognition mode. The received audio signal may further be stored in the memory 804 or sent through the communication component 816. In some examples, the audio component 810 further includes a speaker configured to output the audio signal.

The I/O interface 812 provides an interface between the processing component 802 and peripheral interface modules, such as a keyboard, a click wheel, buttons and the like. The buttons may include, but are not limited to: a home button, a volume button, a starting button and a locking button.

The sensor component 814 includes one or more sensors configured to provide status assessments in various aspects for the electronic device 800. For instance, the sensor component 814 may detect an on/off status of the electronic device 800 and relative positioning of components, such as a display and small keyboard of the electronic device 800, and the sensor component 814 may further detect a change in a position of the electronic device 800 or a component of the electronic device 800, presence or absence of contact between the user and the electronic device 800, orientation or acceleration/deceleration of the electronic device 800 and a change in temperature of the electronic device 800. The sensor component 814 may include a proximity sensor configured to detect presence of an object nearby without any physical contact. The sensor component 814 may also include a light sensor, such as a complementary metal oxide semiconductor (CMOS) or charge coupled device (CCD) image sensor, configured for use in an imaging application. In some examples, the sensor component 814 may also include an acceleration sensor, a gyroscope sensor, a magnetic sensor, a pressure sensor or a temperature sensor.

The communication component 816 is configured to facilitate wired or wireless communication between the electronic device 800 and other electronic devices. The electronic device 800 may access a communication-standard-based wireless network, such as a wireless fidelity (WiFi) network, a 2nd-generation (2G) or 3rd-generation (3G) network or a combination thereof. In an example, the communication component 816 receives a broadcast signal or broadcast associated information from an external broadcast management system through a broadcast channel. In an example, the communication component 816 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In an example, the electronic device 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the abovementioned method.

In an example, there is also provided a non-transitory computer-readable storage medium including instructions, such as included in the memory 804, executable by the processor 820 of the electronic device 800 for performing the abovementioned methods. For example, the non-transitory computer-readable storage medium may be a ROM, a random access memory (RAM), a compact disc read-only memory (CD-ROM), a magnetic tape, a floppy disc, an optical data storage device, and the like.

According to a non-transitory computer-readable storage medium, instructions in the storage medium are executed by a processor of an electronic device to cause the electronic device to execute the character recognition method as described in each abovementioned example.

Other implementations of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as example only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for character recognition, comprising:
    performing image processing on an acquired original image to obtain a region to be recognized, wherein the region comprises a character;
    determining an area ratio of the region to be recognized on the original image;
    determining an angle between the region to be recognized and a preset direction;
    determining a character density of the region to be recognized; and
    performing character recognition on the character in the region to be recognized in response to determining that the area ratio is greater than a ratio threshold, the angle is less than an angle threshold, and the character density is less than a density threshold.

2. The method of claim 1, further comprising:
    determining a first average gray value of at least one pixel in the region to be recognized and a second average gray value of at least one pixel in a preset region extending outwards from the region to be recognized; and
    determining a binarization threshold according to the first average gray value and the second average gray value;
    wherein performing character recognition on the character in the region to be recognized comprises:
    performing binarization processing on the region to be recognized according to the binarization threshold, and
    performing character recognition on the character in the region to be recognized subjected to the binarization processing.

3. The method of claim 1, wherein determining the area ratio of the region to be recognized on the original image comprises:
    determining a maximum inscribed rectangle of the region to be recognized;
    determining an area of the region to be recognized according to an area of the maximum inscribed rectangle; and
    determining the area ratio of the region to be recognized on the original image according to the area of the region to be recognized.

4. The method of claim 1, further comprising:
    determining a height and width of the region to be recognized;
    wherein performing character recognition on the character in the region to be recognized in response to determining that the area ratio is greater than the ratio threshold, the angle is less than the angle threshold, and the character density is less than the density threshold comprises:
    performing character recognition on the character in the region to be recognized in response to determining that the height is greater than a height threshold, or the width is greater than a width threshold, or the height is greater than the height threshold and the width is greater than the width threshold, the area ratio is greater than the ratio threshold, the angle is less than the angle threshold, and the character density is less than the density threshold.

5. The method of claim 4, wherein determining the character density of the region to be recognized comprises:
    determining a character count of the region to be recognized; and
    determining the character density of the region to be recognized according to the character count.

6. The method of claim 1, wherein determining the character density of the region to be recognized comprises:
    determining a character count of the region to be recognized; and
    determining the character density of the region to be recognized according to the character count.

7. The method of claim 6, wherein determining the character count of the region to be recognized comprises:
    projecting the region to be recognized to a set direction to obtain a projected region, wherein the set direction is a row direction of the character in the region to be recognized;
    determining a pixel density distribution of the projected region; and
    determining the character count of the region to be recognized according to the pixel density distribution.

8. The method of claim 1, further comprising:
    extracting a frame image corresponding to a present frame extraction period from a video to be processed as the original image according to the frame extraction period.

9. The method of claim 8, further comprising:
    determining the frame extraction period according to a total length of the video to be processed.

10. The method of claim 1, wherein performing character recognition on the character in the region to be recognized comprises:
    performing optical character recognition (OCR) on the character in the region to be recognized to obtain first character information; and
    performing error correction processing on the first character information to obtain second character information.

11. An apparatus, comprising:
    one or more processors; and
    a non-transitory computer-readable storage medium storing instructions executable by the one or more processors;
    wherein the one or more processors are configured to:
    perform image processing on an acquired original image to obtain a region to be recognized, wherein the region comprises a character;
    determine an area ratio of the region to be recognized on the original image;
    determine an angle between the region to be recognized and a preset direction;
    determine a character density of the region to be recognized; and perform character recognition on the character in the region to be recognized in response to the area ratio being greater than a ratio threshold, the angle being less than an angle threshold, and the character density being less than a density threshold.

12. The apparatus of claim 11, wherein the one or more processors are further configured to:
determine a first average gray value of at least one pixel in the region to be recognized and a second average gray value of at least one pixel in a preset region extending outwards from the region to be recognized; and
determine a binarization threshold according to the first average gray value and the second average gray value;
wherein the one or more processors configured to perform character recognition on the character in the region to be recognized are further configured to:
perform binarization processing on the region to be recognized according to the binarization threshold, and
perform character recognition on the character in the region to be recognized subjected to the binarization processing.

13. The apparatus of claim 11, wherein the one or more processors are further configured to:
determine a maximum inscribed rectangle of the region to be recognized;
determine an area of the region to be recognized according to an area of the maximum inscribed rectangle; and
determine the area ratio of the region to be recognized on the original image according to the area of the region to be recognized.

14. The apparatus of claim 11, wherein the one or more processors are further configured to:
determine a height and width of the region to be recognized;
wherein the one or more processors configured to perform character recognition on the character in the region to be recognized in response to the area ratio being greater than the ratio threshold, the angle being less than the angle threshold, and the character density being less than the density threshold are further configured to:
perform the character recognition on the character in the region to be recognized in response to determining that the height is greater than a height threshold, or the width is greater than a width threshold, or the height is greater than the height threshold and the width is greater than the width threshold, the area ratio is greater than the ratio threshold, the angle is less than the angle threshold, and the character density is less than the density threshold.

15. The apparatus of claim 11, wherein the one or more processors are further configured to:
determine a character count of the region to be recognized; and
determine the character density of the region to be recognized according to the character count.

16. The apparatus of claim 15, wherein the one or more processors are further configured to:
project the region to be recognized to a set direction to obtain a projected region, wherein the set direction is a row direction of the character in the region to be recognized;
determine a pixel density distribution of the projected region; and
determine the character count of the region to be recognized according to the pixel density distribution.

17. The apparatus of claim 16, wherein the one or more processors are further configured to:
extract a frame image corresponding to a present frame extraction period from a video to be processed as the original image according to the frame extraction period.

18. The apparatus of claim 17, wherein the one or more processors are further configured to:
determine the frame extraction period according to a total length of the video to be processed.

19. The apparatus of claim 11, wherein the one or more processors are further configured to:
perform optical character recognition (OCR) on the character in the region to be recognized to obtain first character information; and
perform error correction processing on the first character information to obtain second character information.

20. A non-transitory computer-readable storage medium storing instructions for execution by a computing device having one or more processors, wherein the instructions, when executed by one or more processors, cause the computing device to perform acts comprising:
performing image processing on an acquired original image to obtain a region to be recognized, wherein the region comprises a character;
determining an area ratio of the region to be recognized on the original image;
determining an angle between the region to be recognized and a preset direction;
determining a character density of the region to be recognized; and
performing character recognition on the character in the region to be recognized in response to determining that the area ratio is greater than a ratio threshold, the angle is less than an angle threshold, and the character density is less than a density threshold.

* * * * *